US008368912B2

(12) United States Patent
Sakuma et al.

(10) Patent No.: US 8,368,912 B2
(45) Date of Patent: Feb. 5, 2013

(54) IMAGE FORMING APPARATUS, PRINT CONTROL METHOD, AND COMPUTER-READABLE STORAGE MEDIUM STORING PROGRAM CODE FOR EXECUTING THE CONTROL METHOD

(75) Inventors: Tsuyoshi Sakuma, Yokohama (JP); Yutaka Matsumoto, Saitama (JP); Yuka Saito, Kamakura (JP); Daisuke Masui, Kawasaki (JP); Nobuhiro Shindo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1058 days.

(21) Appl. No.: 12/289,903

(22) Filed: Nov. 6, 2008

(65) Prior Publication Data

US 2009/0122332 A1 May 14, 2009

(30) Foreign Application Priority Data

Nov. 8, 2007 (JP) ................................. 2007-290596
Jun. 20, 2008 (JP) ................................. 2008-161434

(51) Int. Cl.
*G06K 15/00* (2006.01)
(52) U.S. Cl. ...... 358/1.14; 358/1.15; 358/1.1; 358/1.13; 705/24; 710/45; 399/12; 399/45; 399/323; 399/9
(58) Field of Classification Search .................... 399/12, 399/45, 323, 9; 358/1.15, 1.1, 1.13, 1.14; 705/24; 710/45
See application file for complete search history.

(56) References Cited

U.S. PATENT DOCUMENTS

| 2002/0059482 A1* | 5/2002 | Ashizaki et al. ................. 710/5 |
| 2002/0186408 A1* | 12/2002 | Nakaoka et al. ............. 358/1.15 |
| 2004/0257613 A1* | 12/2004 | Okabe et al. ................. 358/1.15 |
| 2005/0271446 A1* | 12/2005 | Minowa ....................... 400/621 |

FOREIGN PATENT DOCUMENTS

| JP | 07-125383 | 5/1995 |
| JP | 10-151832 | 6/1998 |
| JP | 10-161508 | 6/1998 |
| JP | 2006-181867 | 7/2006 |

OTHER PUBLICATIONS

Office Action dated Jun. 1, 2012, for corresponding Japanese Patent Application No. 2008-161434.

* cited by examiner

*Primary Examiner* — Benny Q Tieu
*Assistant Examiner* — Martin Mushambo
(74) *Attorney, Agent, or Firm* — Harness, Dickey & Pierce, P.L.C.

(57) ABSTRACT

An image forming apparatus capable of both normal printing and special-purpose printing includes a first identification unit, a second identification unit, and a selection unit. The first identification unit identifies a type of print data. The second identification unit identifies a type of print material. The selection unit selects a print resource in accordance with a combination of the type of print data identified by the first identification unit and the type of print material identified by the second identification unit. The selection unit selects the print resource so as to prevent unauthorized printing from being performed when the print data is for special-purpose printing.

8 Claims, 6 Drawing Sheets

FONT

| PRINT DATA TYPE \ DEVICE TYPE | SPECIAL-PURPOSE DEVICE | NORMAL-PURPOSE DEVICE |
|---|---|---|
| SPECIAL-PURPOSE PRINT DATA | F1 | F2 |
| NORMAL-PURPOSE PRINT DATA | F3 | F4 |

F1: USE SPECIFIED SPECIAL-PURPOSE FONT WITHOUT CHANGE

F2: REPLACE SPECIFIED SPECIAL-PURPOSE FONT WITH NORMAL-PURPOSE DEFAULT FONT

F3: USE SPECIFIED NORMAL-PURPOSE FONT WITHOUT CHANGE

F4: USE SPECIFIED NORMAL-PURPOSE FONT WITHOUT CHANGE

FIG. 4B

SHEET

| PRINT DATA TYPE \ DEVICE TYPE | SPECIAL-PURPOSE DEVICE | NORMAL-PURPOSE DEVICE |
|---|---|---|
| SPECIAL-PURPOSE PRINT DATA | P1 | P2 |
| NORMAL-PURPOSE PRINT DATA | P3 | P4 |

P1: USE SPECIFIED SPECIAL-PURPOSE SHEET WITHOUT CHANGE

P2: REPLACE SPECIFIED SPECIAL-PURPOSE SHEET WITH NORMAL-PURPOSE DEFAULT SHEET

P3: USE SPECIFIED NORMAL-PURPOSE SHEET WITHOUT CHANGE

P4: USE SPECIFIED NORMAL-PURPOSE SHEET WITHOUT CHANGE

FIG. 4C

FONT AND SHEET

| PRINT DATA TYPE \ DEVICE TYPE | SPECIAL-PURPOSE DEVICE | NORMAL-PURPOSE DEVICE |
|---|---|---|
| SPECIAL-PURPOSE PRINT DATA | T1 | T2 |
| NORMAL-PURPOSE PRINT DATA | T3 | T4 |

T1: USE SPECIFIED SPECIAL-PURPOSE FONT AND SPECIAL-PURPOSE SPECIFIC SHEET WITHOUT CHANGE

T2: REPLACE SPECIFIED SPECIAL-PURPOSE FONT AND SPECIAL-PURPOSE SPECIFIC SHEET WITH NORMAL-PURPOSE DEFAULT FONT AND DEFAULT SHEET

T3: USE SPECIFIED NORMAL-PURPOSE FONT AND NORMAL-PURPOSE FONT WITHOUT CHANGE

T4: USE SPECIFIED NORMAL-PURPOSE FONT AND NORMAL-PURPOSE SHEET WITHOUT CHANGE

FIG. 6

IMAGE FORMING APPARATUS, PRINT CONTROL METHOD, AND COMPUTER-READABLE STORAGE MEDIUM STORING PROGRAM CODE FOR EXECUTING THE CONTROL METHOD

CROSS-REFERENCE TO RELATED APPLICATIONS

The present patent application claims priority pursuant to 35 U.S.C. §119 from Japanese Patent Application Nos. 2007-290596, filed on Nov. 8, 2007, and 2008-161434, filed on Jun. 20, 2008 in the Japan Patent Office, the entire contents of each of which are hereby incorporated herein by reference.

BACKGROUND

1. Field

The present invention relates to an image forming apparatus capable of performing normal printing and special-purpose printing, a print control method, and a computer-readable storage medium, and more specifically, to an image forming apparatus capable of preventing unauthorized printing from being performed based on print data for special-purpose printing, a print control method performed in the image forming apparatus, and a computer-readable storage medium storing program code that cause the image forming apparatus to execute the print control method.

2. Description of the Background

Image forming apparatuses are used as copiers, printers, facsimile machines, and multi-functional devices combining several of the foregoing capabilities. A conventional image forming apparatus such as a laser printer employs a replaceable special device for special-purpose printing to perform printing with special print resources such as font, recording sheet, and so on. For example, when negotiable securities such as checks and bills are printed, a special toner having a relatively stable magnetic charge and high durability is used as a toner serving as a print material, compared to a toner used for printing a normal office document. Further, a special recording sheet and a special font serving as print resources are used to print such securities.

In such a case, forgery is a particular concern. Thus, for example, when an image forming apparatus has a copying function, securities may be copied. Further, when the image forming apparatus has a facsimile function, a user may scan a security using another facsimile apparatus, transmit the scanned data to the image forming apparatus, and print the data using the image forming apparatus, thereby allowing the security to be forged.

A conventional image forming apparatus having the ability to prevent securities from being forged is usable as a MICR (magnetic ink character recognition) printer by replacing a process cartridge for normal printing with a process cartridge for MICR. The conventional image forming apparatus includes a control device for restricting copy mode and fax mode operations when the process cartridge for MICR is mounted in the image forming apparatus.

However, there is a flaw in the conventional image forming apparatus in that, when the process cartridge for normal printing is mounted in the image forming apparatus, an ill-intentioned user can perform unauthorized printing by printing using print data for MICR in printer mode.

In view of the above-described situation, the present invention provides an image forming apparatus capable of preventing unauthorized printing with a print material for normal printing and a resource for special-purpose printing from being performed based on print data in which a resource for special-purpose printing is specified.

SUMMARY

At least one illustrative embodiment of the present invention provides an image forming apparatus capable of preventing unauthorized printing with a print material for normal printing and a resource for special-purpose printing from being performed based on print data in which a resource for special-purpose printing is specified.

In one illustrative embodiment of the present invention, an image forming apparatus capable of both normal printing and special-purpose printing includes a first identification unit, a second identification unit, and a selection unit. The first identification unit identifies a type of print data. The second identification unit identifies a type of print material. The selection unit selects a print resource in accordance with a combination of the type of print data identified by the first identification unit and the type of print material identified by the second identification unit. The selection unit selects the print resource so as to prevent unauthorized printing from being performed when the print data is for special-purpose printing.

In another illustrative embodiment of the present invention, a method of controlling printing by an image forming apparatus capable of both normal printing and special-purpose printing includes identifying a type of print data, identifying a type of print material, and selecting a print resource based on a combination of the identified type of print data and the identified type of print material. The selecting selects the print resource so as to prevent unauthorized printing from being performed when the print data is for special-purpose printing.

In still another illustrative embodiment of the present invention, a computer-readable storage medium stores program code that causes a computer to execute a method of controlling printing by an image forming apparatus capable of both normal printing and special-purpose printing. The method includes identifying a type of print data, identifying a type of print material, and selecting a print resource based on a combination of the identified type of print data and the identified type of print material. The selecting selects the print resource so as to prevent unauthorized printing from being performed when the print data is for special-purpose printing.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Below, illustrative embodiments according to the present invention are described with reference to drawings.

Figure 1:
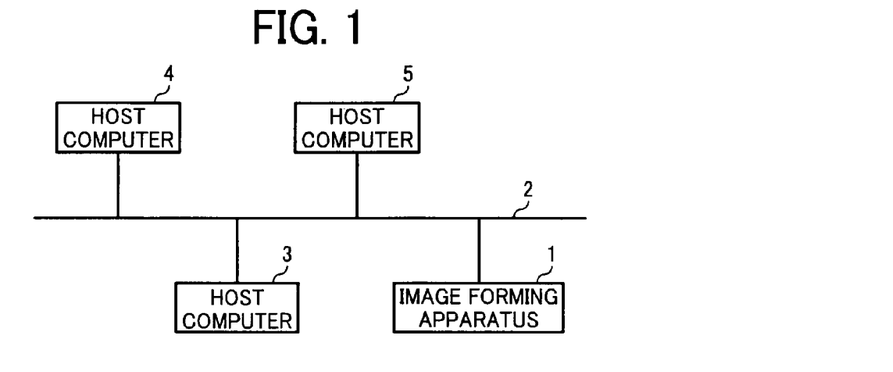
FIG. 1 is a print system including an image forming apparatus according to an illustrative embodiment of the invention.

FIG. 1 is a schematic diagram illustrating a print system including an image forming apparatus according to an illustrative embodiment of the present invention. The print system includes an image forming apparatus 1, a communication medium 2 such as a LAN (local area network), and a plurality of host computers 3 to 5 connected to the image forming apparatus 1 via the communication medium 2. In the print system, the image forming apparatus 1 receives print data sent from a host computer, which is an upper level device, via the communication medium 2, interprets the print data, and generates video data for printing.

Figure 2:
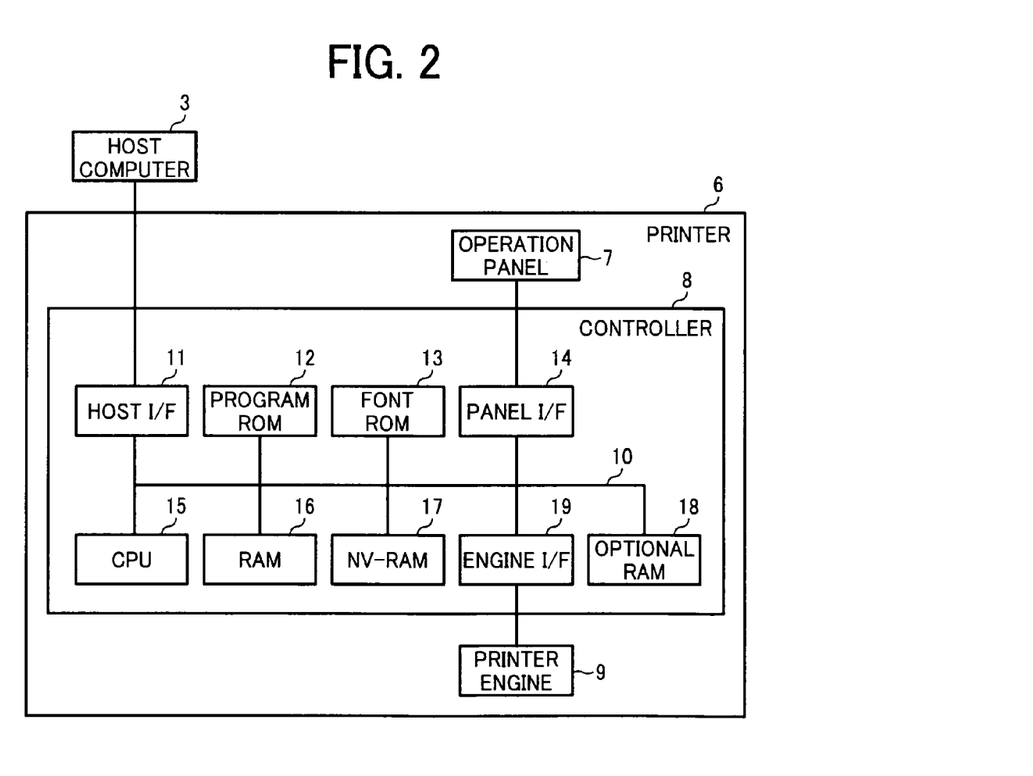
FIG. 2 is a block diagram illustrating a hardware configuration of a printer used in the image forming apparatus illustrated in FIG. 1.

FIG. 2 is a block diagram illustrating a hardware configuration of a printer used in the image forming apparatus 1 of FIG. 1. The printer 6 includes an operation panel 7, a controller 8, and a printer engine 9.

Although not shown, the operation panel 7 includes a display portion, such as an LCD (liquid crystal display), and a switching portion for switching control modes, fonts, and so on of the printer 6. The printer engine 9 forms an electrostatic latent image on a photoconductor in accordance with the video data generated by the image forming apparatus 1 and a control signal sent from the controller 8, and develops the latent image into a visible image. The printer engine 9 transfers the visible image onto a recording sheet fed from a sheet feed portion and fixes the image on the sheet, so that a desired image is formed on the recording sheet.

The controller 8 converts plot data received from a host computer 3 into video data in accordance with a control mode set at the time and a control code sent from the host computer 3, and outputs the video data to the printer engine 9. As shown in FIG. 2, the controller 8 includes a bus 10, a host interface (I/F) 11, a program ROM (read only memory) 12, a font ROM 13, a panel I/F 14, a CPU (central processing unit) 15, a RAM (random access memory) 16, a non-volatile (NV) RAM 17, an optional RAM 18, and an engine I/F 19. The host I/F 11, the program ROM 12, the font ROM 13, the panel I/F 14, the CPU 15, the RAM 16, the NV-RAM 17, the optional RAM 18, and the engine I/F 19 are connected to and by the bus 10.

The host I/F 11 is an interface for print data transmitted from a host computer 3 to the printer 6 and a status signal transmitted from the printer 6 to the host computer 3. The program ROM 12 stores programs for managing data in the controller 8 and controlling peripheral modules. The font ROM 13 stores various types of fonts used for printing. The panel I/F is an interface for signals that switch statuses, modes, fonts, etc., of the printer 6. The CPU 15 processes the print data, which includes plot data, print control data, and other data, received from the host computer 3 in accordance with a program stored in the program ROM 12. The RAM 16 serves as a work memory used when the CPU 15 performs processing, a buffer for temporarily storing the data from the host computer 3 in page units, and a bitmap memory for converting the data stored in the buffer into print pattern data and storing the pattern data as video data. The NV-RAM 17 is a non-volatile memory that stores data to be retained even after the apparatus is turned off. The optional RAM 18 is an extended memory to store data other than the data stored in the RAM 16 and the NV-RAM 17. The engine I/F 19 is an interface for control signals transmitted from the controller 8 and the printer engine 9 and status signals transmitted from the printer 6 to the controller 8.

In the above-described configuration, the print data transmitted from the host computer 3 via the host interface 11 is separated into the plot data, the print control data, and the other data. The plot data and the print control data are stored in the buffer. For example, when the plot data is a character code, an intermediate code including information on print position, print size, and font is generated and stored in the buffer. When a print instruction or print data from the host computer 3 exceeds a data amount corresponding to one page, the controller 8 converts the intermediate code into video data. On completion of the conversion, the controller 8 sends a print start instruction to the printer engine 9 via the engine I/F 19. Thus, the printer engine 9 performs printing in accordance with the plot data from the host computer 3.

Although the processing of the data from the host computer 3 is described above, the same processing is performed on data from any of the host computers 4 and 5.

The printer 6 is capable of performing special-purpose printing for various purposes as well as normal printing for normal purposes such as printing of typical office documents. For example, to perform a special-purpose printing such as MICR (magnetic ink character recognition), a specific device such as an optional toner unit is mounted to the printer 6, and the printer 6 uses special resources, such as a special font and a special recording sheet, to produce a printed material suitable for a desired special purpose.

However, since such special-purpose printing is not performed constantly, it is not effective to use the printer 6 and the host computer 3 for such a special purpose only, and it is necessary to use the printer 6 and the host computer 3 while switching between normal-purpose setting and special-purpose setting. In such a case, when performing special-purpose printing, the printer 6 is equipped with a specific device and employs a specific resource. By contrast, when performing normal-purpose printing, the printer 6 is equipped with a normal-purpose device and employs a normal-purpose resource. Consequently, it is necessary to prevent unauthorized printing with a special-purpose resource from being performed in the normal-purpose device when special-purpose print data is inadvertently mistransmitted to the printer 6 equipped with the normal-purpose device.

Hence, according to this illustrative embodiment, the NV-RAM 17 stores information defining constraints on use of special-purpose resources corresponding to a combination of a device type and a print data type. The CPU 15 identifies both the type of device mounted in the printer engine 9 and the type of print data received, and based on the identification results, selects a corresponding constraint on use of specific resource out of the information stored in the NV-RAM 17. The CPU 15 also controls printing operation in accordance with the selected constraint, thereby preventing unauthorized printing from being executed.

Figure 3:
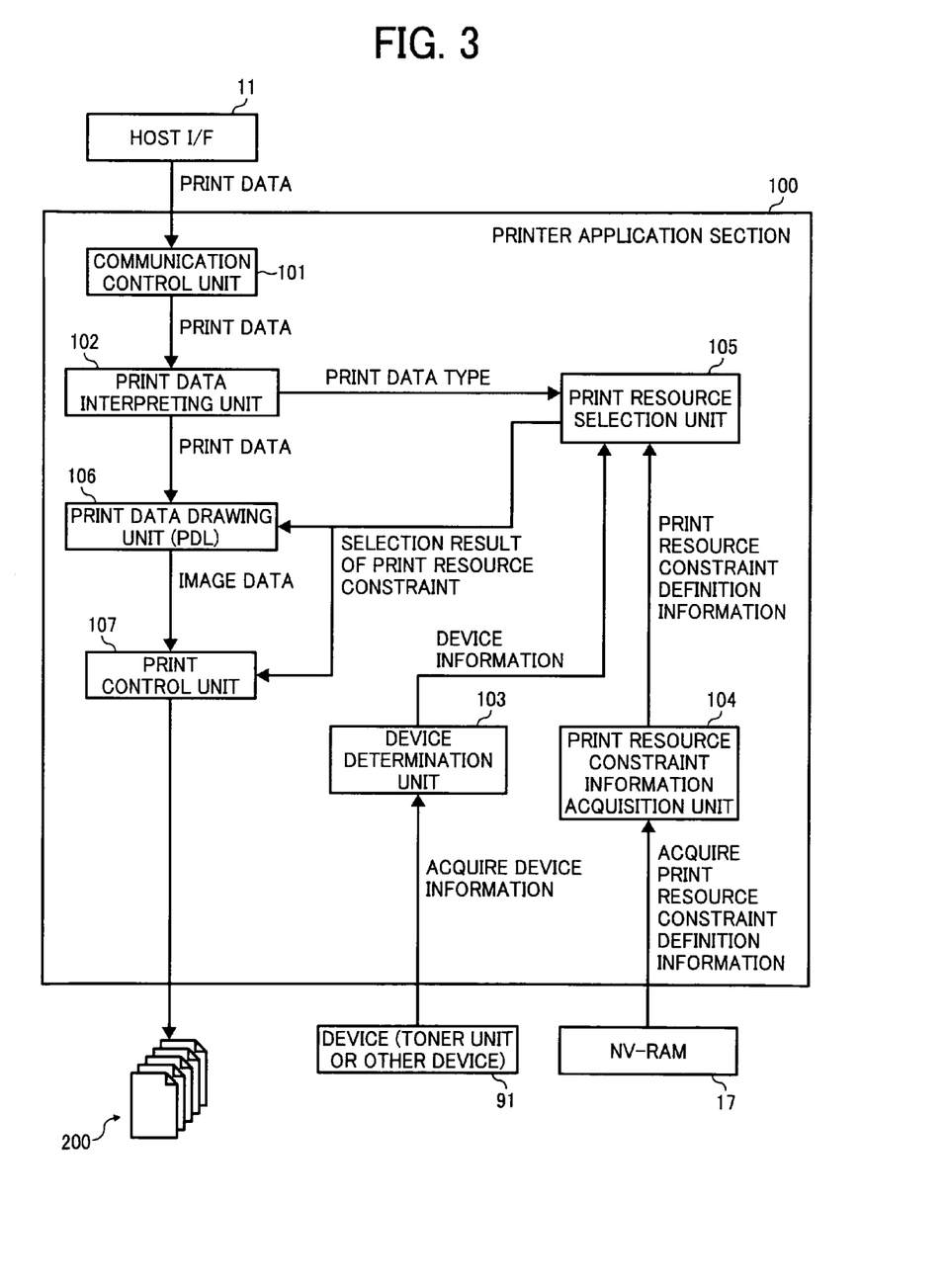
FIG. 3 is a block diagram illustrating a software configuration of a printer application section in an image forming apparatus according to an illustrative embodiment.

FIG. 3 is a block diagram illustrating an example of a software configuration of a printer application section 100 according to an illustrative embodiment of the present invention. The printer application section 100 includes a communication control unit 101, a print data interpreting unit 102, a device determination unit 103, a print resource constraint information acquisition unit 104, a print resource selection unit 105, a print data drawing unit (PDL) 106, and a print control unit 107.

The communication control unit 101 receives print data from the host I/F 11 and transfers the print data to the print data interpreting unit 102. The print data interpreting unit 102 interprets the print data, identifies the print data type, i.e., whether the print data is for a special purpose or a normal purpose, and transmits information indicating the identification result to the print resource selection unit 105. The print data interpreting unit 102 also transmits the print data to the print data drawing unit 106.

The device determination unit 103 receives device information from a device 91 such as a toner unit provided in the printer engine 9, identifies the device type, and transmits information on the identification result to the print resource selection unit 105. The print resource constraint information acquisition unit 104 acquires constraint information on use of print resources, such as a font and a recording sheet, and transmits the constraint information to the print resource selection unit 105.

The print resource selection unit 105 selects a relevant print resource constraint out of the print resources use constraint information, which is acquired by the print resource constraint information acquisition unit 104 in accordance with the device type identified at the device determination unit 103, and reports the selection result to the print data drawing unit 106 and the print control unit 107.

The print data drawing unit 106 converts the print data sent from the print data interpreting unit 102 into image data (e.g. bitmap data) based on a font condition of the selected print resource constraint, and transmits the image data to the print control unit 107.

Based on the image data transmitted from the print data drawing unit 106, the print control unit 107 outputs an image on a recording sheet defined in a sheet condition of the selected print resource constraint to produce a printed matter 200.

Figure 4A:
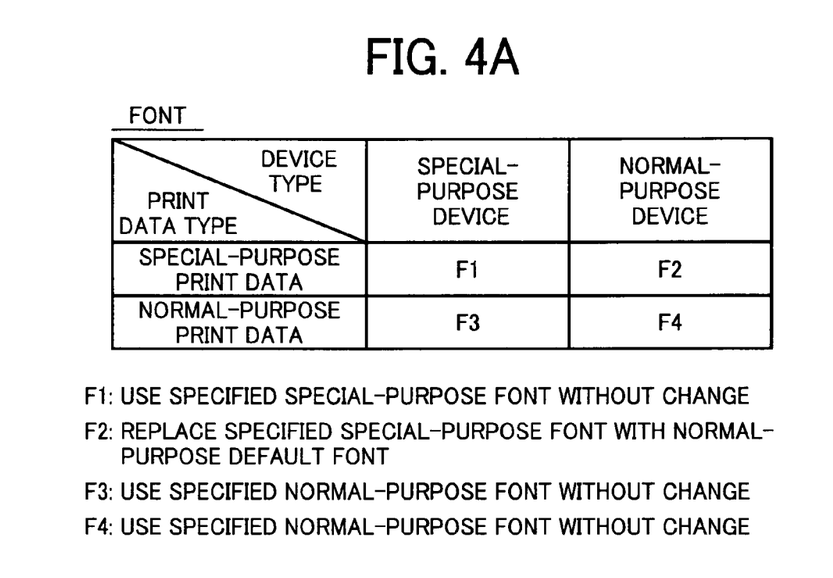
FIG. 4A illustrates an example of information defining constraints on font.
Figure 4B:
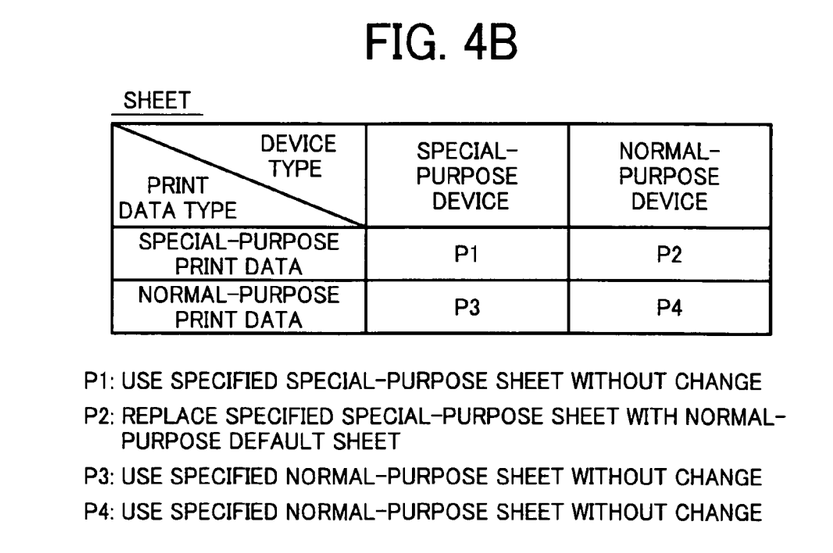
FIG. 4B illustrates an example of information defining constraints on recording sheet.
Figure 4C:
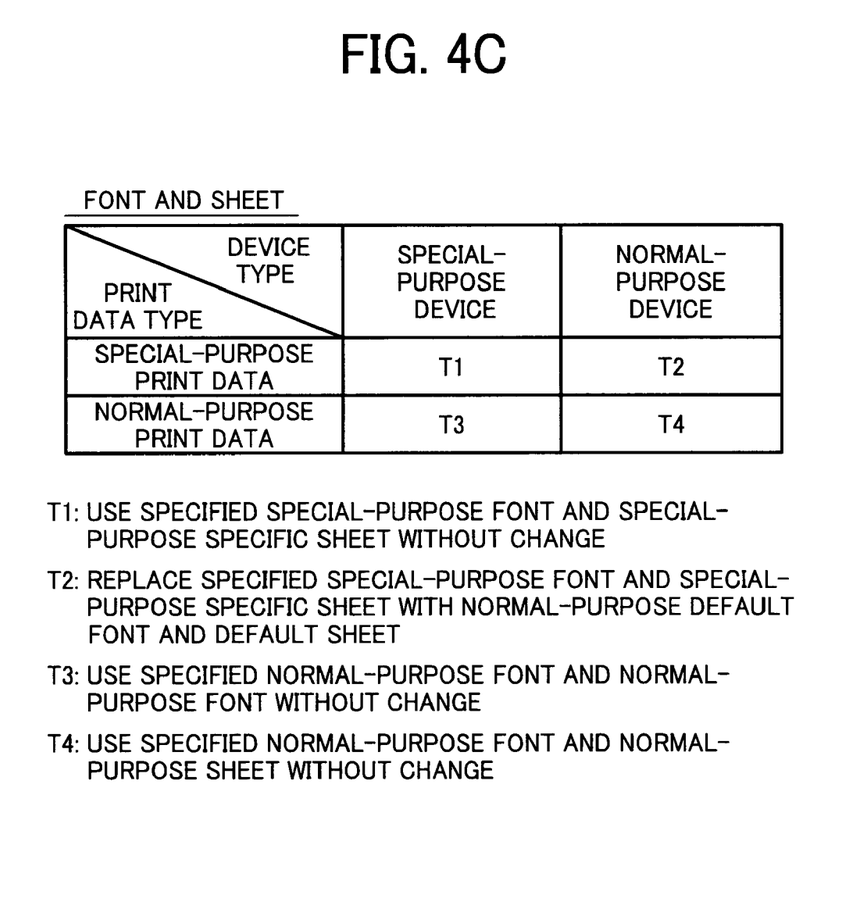
FIG. 4C illustrates an example of information defining constraints on font and recording sheet.

FIGS. 4A to 4C illustrate examples of information defining constraints on use of print resources stored in the NV-RAM 17. FIG. 4A illustrates an example of information defining constraints on font. FIG. 4B illustrates an example of information defining constraints on recording sheet. FIG. 4C illustrates an example of information defining constraints on font and recording sheet.

Figure 5:
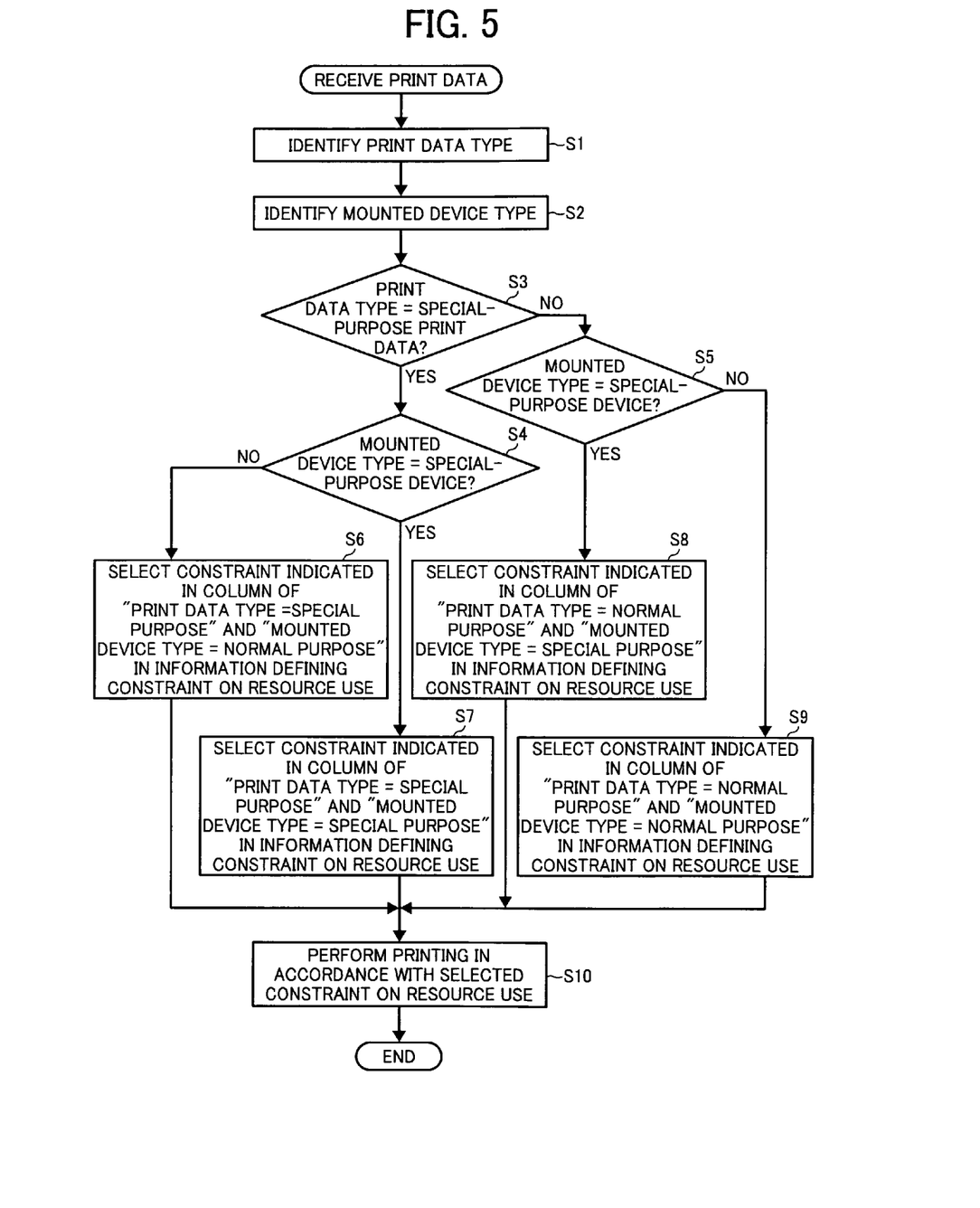
FIG. 5 is a flow chart illustrating an example of print operation of an image forming apparatus according to an illustrative embodiment.

Next, a description is given of print operation with reference to a flow chart illustrated in FIG. 5 and the software block diagram illustrated in FIG. 3. The process flow illustrated in FIG. 5 starts when the CPU 15 receives print data via the host I/F.

At S1, the print data interpreting unit 102 identifies the print data type based on the "other data" contained in the print data. At a head portion of the print data, data indicating the type of print data may be described using a job description language such as PJL (printer job language). For example, when the type of print data is for a special purpose, a command such as "@PJL SET PRINT DATA=SPECIAL" may be described. By contrast, when the type of print data is for normal purpose, the command is not described, or like "PRINT DATA=NORMAL", a parameter indicating that the print data is for normal purpose may be specified in the right-hand side of the above-described command. Alternatively, when there are a plurality of special-purpose print data, a plurality of parameters should be settable in the right-hand side of the above-described command.

Next, at S2, the device determination unit 103 acquires device information from the device 91 mounted in the printer engine 9, identifies a type of the device 91, and transmits the identification result to the print resource selection unit 105.

The print resource selection unit 105 refers to the type of print data received from the print data interpreting unit 102, the device information received from the device determination unit 103, and the information defining constraints on print resources read from the NV-RAM 17 by the print resource constraint information acquisition unit 104. As in the following procedures (a) to (d) described below, a relevant constraint on resource use is selected at S6 to S9 in accordance with a combination of the identified print data type and the identified device type, and the selection result is reported to the print data drawing unit 106 and the print control unit 107.

The print data drawing unit 106 uses a font defined by the font condition of the selected print resource constraint, to convert the print data sent from the print data interpreting unit 102 into image data. Based on the image data, at S10 the print control unit 107 prints on a recording sheet defined by a sheet condition of the selected print resource constraint, thereby performing proper printing while preventing unauthorized printing from being executed.

(a) If the print data is for a special purpose ("YES" at S3) and the device 91 is not for a special purpose ("NO" at S4), at S6 a constraint in the column of "print data type"="special purpose" and "mounted device type"="normal purpose" is selected. Specifically, as illustrated in F2 of FIG. 4A, P2 of FIG. 4B, and T2 of FIG. 4C, a special-purpose font specified in the "other data" of the print data is replaced with a default font for normal purpose, and a specified special sheet for special purpose is replaced with a default sheet for normal purpose. Accordingly, based on the special-purpose print data, printing is performed on the normal-purpose sheet using the special-purpose device and the normal-purpose font, thereby preventing unauthorized printing from being executed.

(b) If the print data is special-purpose print data ("YES" at S3) and the mounted device is a special-purpose device ("YES" at S4), at S7 a constraint in the column of "print data type"="special purpose" and "mounted device type"="special purpose" is selected. Specifically, as illustrated in F1 of FIG. 4A, P1 of FIG. 4B, and T1 of FIG. 4C, a specified special-purpose font is used without change, and a specified special-purpose sheet is used without change. Accordingly, based on the special-purpose print data, printing is performed on the special-purpose sheet using the special-purpose device and the special-purpose font, thus allowing the special-purpose printing to be properly executed.

(c) If the print data is not special-purpose print data ("NO" at S3) and the mounted device is a special-purpose device ("YES" at S5), at S8 a constraint in the column of "print data type"="normal purpose" and "mounted device type"="special purpose" is selected. Specifically, as illustrated in F3 of FIG. 5A, P3 of FIG. 5B, and T3 of FIG. 4C, the specified normal-purpose font is used without change, and the specified normal-purpose sheet is used without change. Accordingly, based on the normal-purpose print data, printing is performed on the normal-purpose sheet using the special-purpose device and the normal-purpose font, thereby preventing unauthorized printing from being executed.

(d) If the print data is not special-purpose print data ("NO" at S3) and the mounted device is not a special-purpose device ("NO" at S5), at S9 a constraint in the column of "print data type"="normal purpose" and "mounted device type"="normal purpose" is selected. Specifically, as illustrated in F4 of FIG. 5A, P4 of FIG. 5B, and T4 of FIG. 4C, the specified normal-purpose font is used without change, and the specified normal-purpose sheet is used without change. Accordingly, based on the normal-purpose print data, printing is performed on the normal-purpose sheet using the normal-purpose device and the normal-purpose font, thus allowing the normal printing to be properly executed.

Figure 6:
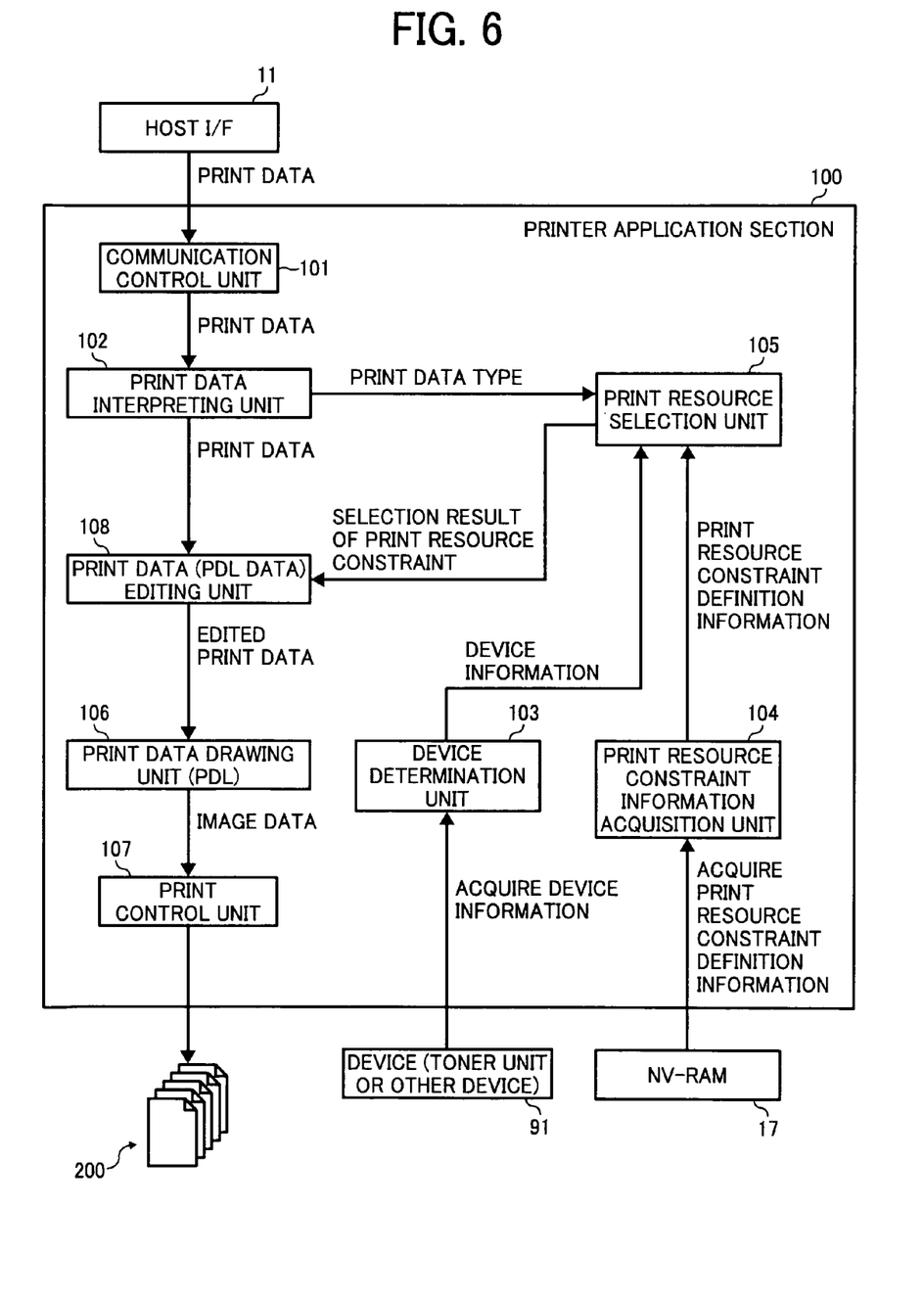
FIG. 6 is a block diagram illustrating another software configuration of a printer application section in an image forming apparatus according to an illustrative embodiment.

FIG. 6 is a block diagram illustrating another example of a software configuration of a printer application section according to an illustrative embodiment. In FIG. 6, the same reference numbers as those of FIG. 3 are given to blocks identical or corresponding to those of FIG. 3. In the software configuration shown in FIG. 6, the print (PDL) data editing unit 108 is provided between the print data interpreting unit 102 and the print data drawing unit 106 illustrated in FIG. 3, and selection results of print resource constraint in the print resource selection unit 105 are input to the print data editing unit 108.

The print data editing unit 108 replaces or switches print resources, such as fonts and recording sheets, in accordance with the selection results of print resource constraint sent from the print resource selection unit 105. In other words, the print data sent from the host I/F 11 includes commands that specify a font resource and/or a sheet resource, and the print data editing unit 108 edits the commands by replacing or switching print resources, when needed. The print data drawing unit 106 and the print control unit 107 of FIG. 6, unlike those of FIG. 3, do not perform font replacement or sheet switching. In other words, the print data drawing unit 106 converts input print data into image data without modification, and the print control unit 107 forms an image on a recording sheet in accordance with the image data.

As described above, according to at illustrative embodiment of the present disclosure, in an image forming apparatus that receives print data from a host computer via communication medium, interprets the print data, and generates video data to be printed, the type of the print data received and the type of the device mounted to the image forming apparatus are identified. Based on the identification results, the image forming apparatus refers to information defining constraints on resource use, selects a relevant constraint on use of print resources, and prints in accordance with the selected constraint, thereby performing proper printing while preventing unauthorized printing from being executed.

Illustrative embodiments being thus described, it should be apparent to one skilled in the art after reading this disclosure that the examples and embodiments may be varied in many ways. Such variations are not to be regarded as a departure from the spirit and scope of the present invention, and such modifications are not excluded from the scope of the following claims.

What is claimed is:

1. An image forming apparatus capable of both normal printing and special-purpose printing, comprising:
a receiving unit configured to receive print data from an external apparatus;
a first determination unit configured to determine whether a type of the received print data is for special-purpose printing;
a second determination unit configured to determine whether a type of device mounted on the image forming apparatus is for special-purpose printing;
a selection unit configured to select a constraint for special-purpose in a case where the type of the received print data
is for special-purpose printing and the type of device mounted on the image forming apparatus is for special-purpose printing, and to select a constraint for normal printing in a case where the type of the received print data is for special-purpose printing and the type of device mounted on the image forming apparatus is not for special-purpose printing; and
a print control unit configured to print the received print data in accordance with the selected constraint.

2. The image forming apparatus according to claim 1, further comprising a storage unit configured to store information that defines a constraint on use of the print resource in accordance with the combination of the type of print data and the type of device information,
wherein the selection unit selects the print resource based on the information stored in the storage unit.

3. The image forming apparatus according to claim 1, wherein the print resource is at least one of a print sheet and a font.

4. The image forming apparatus according to claim 1, wherein the selection unit selects a print resource for normal printing when the print data is for special-purpose printing and the device information is for normal printing.

5. A method of controlling printing by an image forming apparatus capable of both normal printing and special-purpose printing, comprising:
identifying a type of print data so as to determine whether the print data is a normal printing or a special-purpose printing;
identifying a type of device information so as to determine whether hardware for special-purpose printing is mounted on the image forming apparatus;
selecting a print resource based on a combination of the identified type of print data and the identified type of device information; and
determining to print the print data with a print setting with one of:
for normal printing, if the print setting for special-purpose printing is identified in the print data and the hardware for special-purpose printing is not mounted on the image forming apparatus, and
for special-purpose printing, if the print setting for special-purpose printing is identified in the print data and the hardware for special-purpose printing is mounted on the image forming apparatus,
wherein the selecting selects the print resource so as to prevent unauthorized printing from being performed when the print data is for special-purpose printing.

6. The method according to claim 5, wherein the selecting selects the print resource based on information that defines a constraint on use of the print resource corresponding to the combination of the identified type of print data and the identified type of device information.

7. The method according to claim 5, wherein the selecting selects a print resource for normal printing when the print data is for special-purpose printing and the device information is for normal printing.

8. A non-transitory computer-readable storage medium storing program code that causes a computer to execute a method of controlling printing by an image forming apparatus capable of both normal printing and special-purpose printing, the method comprising:
- identifying a type of print data so as to determine whether the print data is a normal printing or a special-purpose printing;
- identifying a type of device information so as to determine whether hardware for special-purpose printing is mounted on the image forming apparatus;
- selecting a print resource based on a combination of the identified type of print data and the identified type of device information; and
- determining to print the print data with a print setting with one of:
  - for normal printing, if the print setting for special-purpose printing is identified in the print data and the hardware for special-purpose printing is not mounted on the image forming apparatus, and
  - for special-purpose printing, if the print setting for special-purpose printing is identified in the print data and the hardware for special-purpose printing is mounted on the image forming apparatus,
- wherein the selecting selects the print resource so as to prevent unauthorized printing from being performed when the print data is for special-purpose printing.

* * * * *